US012798861B2

(12) United States Patent
Chiang

(10) Patent No.: US 12,798,861 B2
(45) Date of Patent: Nov. 17, 2026

(54) HONEYCOMB CELL SHOCK-PROTECTION PAPER PAD FABRICATION METHOD

(71) Applicant: 1teck Automation Technology Co., Ltd., Tongxiang (CN)

(72) Inventor: Tung-Lung Chiang, Tongxiang (CN)

(73) Assignee: ITECK AUTOMATION TECHNOLOGY CO., LTD., Tongxiang (CN)

( * ) Notice: Subject to any disclaimer, the term of this patent is extended or adjusted under 35 U.S.C. 154(b) by 53 days.

(21) Appl. No.: 18/963,786

(22) Filed: Nov. 29, 2024

(65) Prior Publication Data

US 2025/0091788 A1 Mar. 20, 2025

Related U.S. Application Data

(62) Division of application No. 18/256,637, filed on Jun. 9, 2023, now Pat. No. 12,565,370.

(51) Int. Cl.

*B65D 81/127* (2006.01)
*B31D 3/02* (2006.01)
*B31D 3/04* (2006.01)

(52) U.S. Cl.

CPC ......... *B65D 81/127* (2013.01); *B31D 3/0292* (2013.01); *B31D 3/04* (2013.01)

(58) Field of Classification Search

CPC ...... B31D 3/0292; B31D 3/04; B31D 3/0284; B31D 3/0253; B31D 3/0238; B31D 3/0223; B65D 81/127

See application file for complete search history.

(56) References Cited

U.S. PATENT DOCUMENTS

| | | | | | |
|---|---|---|---|---|---|
| 3,480,497 | A * | 11/1969 | Menzer | B32B 3/12 | 428/116 |
| 3,587,479 | A * | 6/1971 | Geschwender | B31D 3/0284 | 156/197 |
| 3,996,087 | A * | 12/1976 | May | B31D 3/0292 | 156/197 |
| 5,975,180 | A * | 11/1999 | Durinck | B32B 37/146 | 83/425.2 |
| 8,647,250 | B2 * | 2/2014 | French | B65D 65/44 | 493/379 |
| 11,801,654 | B2 * | 10/2023 | Chiang | B31D 3/0292 | |
| 2012/0021168 | A1 * | 1/2012 | Tanii | B32B 37/146 | 428/116 |
| 2023/0391040 | A1 * | 12/2023 | Macgillivray | B31D 5/0065 | |

* cited by examiner

*Primary Examiner* — Thomas M Wittenschlaeger

(74) *Attorney, Agent, or Firm* — Birch, Stewart, Kolasch & Birch, LLP

(57) ABSTRACT

A honeycomb cell shock-protection paper pad shape-fixing method for reducing elastic restoration after stretching includes stretching and extending a contracted cellular-form shock-protection paper pad so that paper strips collectively define honeycomb cells each having a hexagonal shape; passing the stretched paper pad between a flexible upper scraper blade and a flexible lower scraper blade to cause upper and lower ends of the paper strips to bend toward the same side; and passing the paper pad between paired rollers having a designated gap to perform shape-fixing rolling, thereby forming folded-edge bend portions at portions where the paper strips are not connected to one another and central bend portions at portions where the paper strips are connected to one another.

4 Claims, 6 Drawing Sheets enlarged view showing Portion C enlarged view showing Portion D

HONEYCOMB CELL SHOCK-PROTECTION PAPER PAD FABRICATION METHOD

CROSS-REFERENCE TO RELATED APPLICATIONS

This is a divisional application of co-pending patent application Ser. No. 18/256,637, filed on Jun. 9, 2023.

TECHNICAL FIELD OF THE INVENTION

The present invention relates to packaging of articles, and more particularly to a honeycomb cell shock-protection paper pad structure, and a fabrication method and a fabrication apparatus.

DESCRIPTION OF THE PRIOR ART

The progress of cargo delivery allows people to realize movement and transportation of various objects, such as documents and articles, through shipping delivery, and consequently, a huge amount of packaging materials are consumed for such a purpose. Such objects involve a large number of types, and particularly, for the fragile objects, honeycomb cell shock-protection paper pads have been widely used for packaging of such objects in shipping and transportation.

In the known technology, shock-protection materials include shock-absorbing boards or blocks, bubble bags, and honeycomb cell shock-protection paper pads, which are used for shock-protection packaging of fragile objects. Shock-absorbing boards or blocks and bubble bags have various disadvantages, such as bulkiness, lack of environmental friendliness, and difficulty in recycling and recovering packaging waste. A honeycomb cell shock-protection paper pad must first be stretched and extended before it can provide shock absorption. Conventionally, the honeycomb cell shock-protection paper pad may be stretched and extended mechanically or manually. Since a paper-made cellular-form shock-protection pad is generally elastic, after being stretched and extended, the paper-made cellular-form shock-protection pad may restore back to its original shape due to elasticity if it is not properly restrained. This may cause trouble to users.

SUMMARY OF THE INVENTION

The present invention is made to overcome the paper-made cellular-form shock-protection pad, after being stretched and extended, restoring back to an original shape before stretching and extending due to elasticity. Being developed on the basis of a known structure of honeycomb cell shock-protection paper pad, the present invention changes a known structure of paper-made cellular-form shock-protection pad by means of shaping technology so as to realize shape fixing of the paper-made cellular-form shock-protection paper pad after being stretched and extended to hold the fixed shape of the paper-made cellular-form shock-protection paper pad to prevent restoration thereof back to an original state before stretching and extending. To address the above issue, the present disclosure relates to honeycomb cell shock-protection paper pads and, in particular, to a shape-fixing method therefor.

The techniques adopted in the present invention to realize such purposes are as follows:

A honeycomb cell shock-protection paper pad structure is provided. The shock-protection paper pad structure is formed of a group of paper strips that are connected together in a uniformly distributed and spaced manner, so that the paper strips collectively define a honeycomb cellular structure.

The paper strips include folded-edge bend portions at upper and lower ends of portions where the paper strips are not connected to one another, and central bend portions at portions where the paper strips are connected to one another.

A honeycomb cell shock-protection paper pad shape-fixing method is provided. The method is performed to stretch and extend a contracted cellular-form shock-protection paper pad that is formed of a group of parallel arranged paper strips connected to each other in a uniformly distributed and spaced manner, the method comprising:

Step A1, stretching and extending the contracted cellular-form shock-protection paper pad to form a honeycomb cell shock-protection paper pad in which the paper strips collectively define a plurality of honeycomb cells each having a hexagonal shape;

Step A2, while maintaining the honeycomb cell shock-protection paper pad in a stretched state, passing the honeycomb cell shock-protection paper pad between a flexible upper scraper blade and a flexible lower scraper blade to cause upper and lower ends of the paper strips to bend toward the same side; and Step A3, passing the honeycomb cell shock-protection paper pad processed in Step A2 between paired rollers having a designated gap therebetween to implement shape-fixing rolling to form a honeycomb cell shock-protection paper pad having a designated thickness, with the paper strips forming folded-edge bend portions on the upper and lower ends of the paper strips at portions where the paper strips are not connected to one another, and the paper strips forming central bend portions at portions where the paper strips are connected to one another.

The designated gap between the paired rollers for the operation of shape-fixing rolling is in a range from 30% to 50% of a thickness of the honeycomb cell shock-protection paper pad before the honeycomb cell shock-protection paper pad enters the paired rollers.

A honeycomb cell shock-protection paper pad shape-fixing apparatus comprises: a chassis portion, an edge scraper portion, and a shape-fixing roller portion.

The edge scraper portion comprises: a flexible upper scraper blade and a flexible lower scraper blade. The flexible upper scraper blade and the flexible lower scraper blade are mounted obliquely on the chassis portion. A distance between the flexible upper scraper blade and the flexible lower scraper blade is less than a thickness of the honeycomb cell shock-protection paper pad.

The shape-fixing roller portion comprises rigid shaping paired rollers. The rigid shaping paired rollers are mounted on the chassis portion. A designated gap between the rigid shaping paired rollers is in a range from 30% to 50% of a thickness of the honeycomb cell shock-protection paper pad before the honeycomb cell shock-protection paper pad enters the rigid shaping paired rollers.

The efficacy of the present invention is as follows:

A honeycomb shock-protection paper pad structure has advantages of a simplified structure, improved shape retention, and ease of operation.

A honeycomb cell shock-protection paper pad shape-fixing method, the method being easy and allowing stretching and shape fixing to be done in one process.

A honeycomb cell shock-protection paper pad shape-fixing apparatus has a simple structure and a high efficiency.

A detailed description of the present invention will be provided below with reference to the attached drawings.

DETAILED DESCRIPTION OF THE PREFERRED EMBODIMENT

Figure 1:
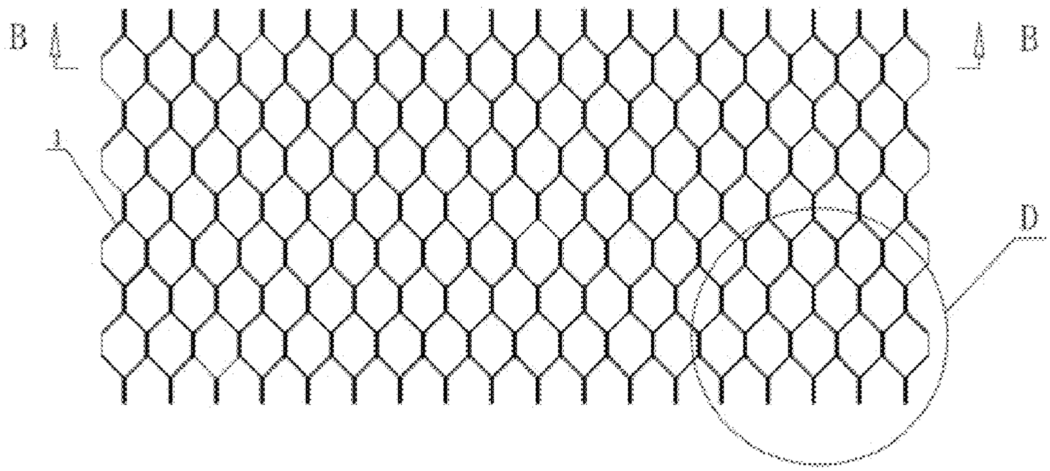
FIG. 1 is a schematic view showing a honeycomb cell shock-protection paper pad structure according to the present invention.
Figure 2:
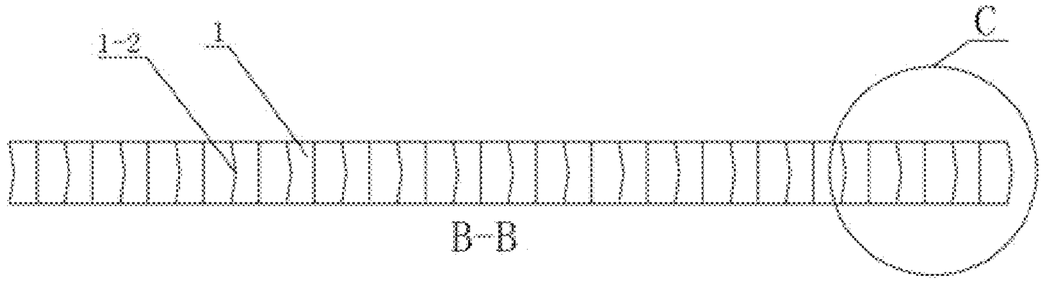
FIG. 2 is a schematic cross-sectional view taken along line B-B of FIG. 1.
Figure 3:
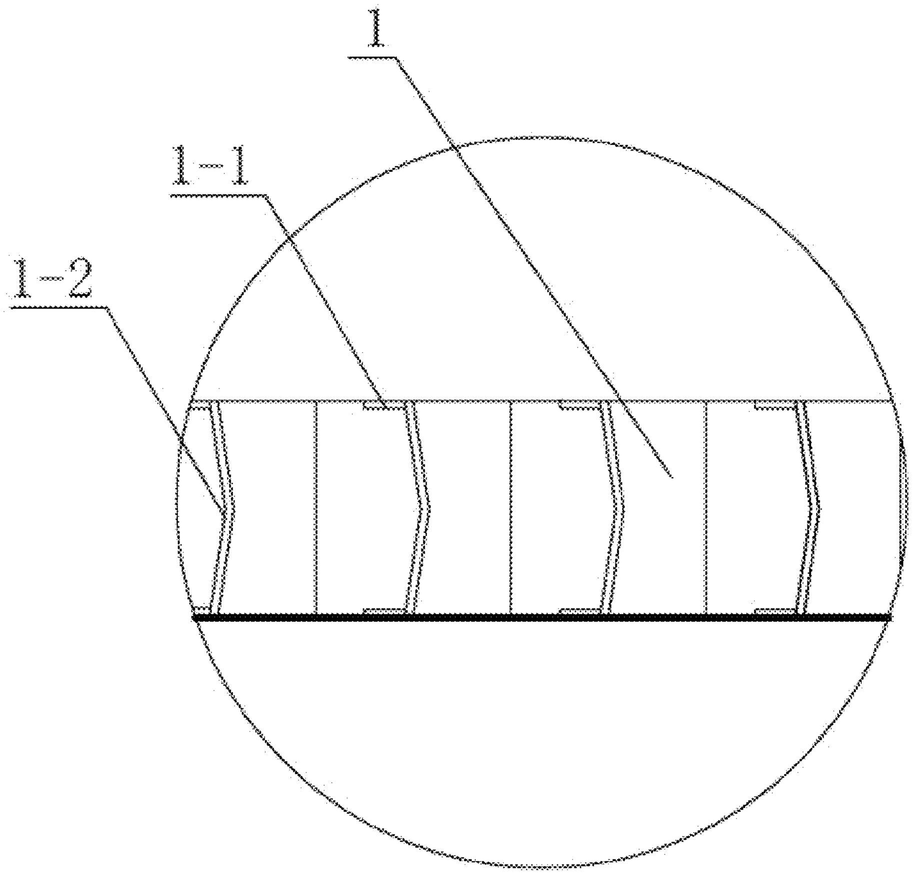
FIG. 3 is schematic enlarged view showing Portion C of FIG. 2.
Figure 4:
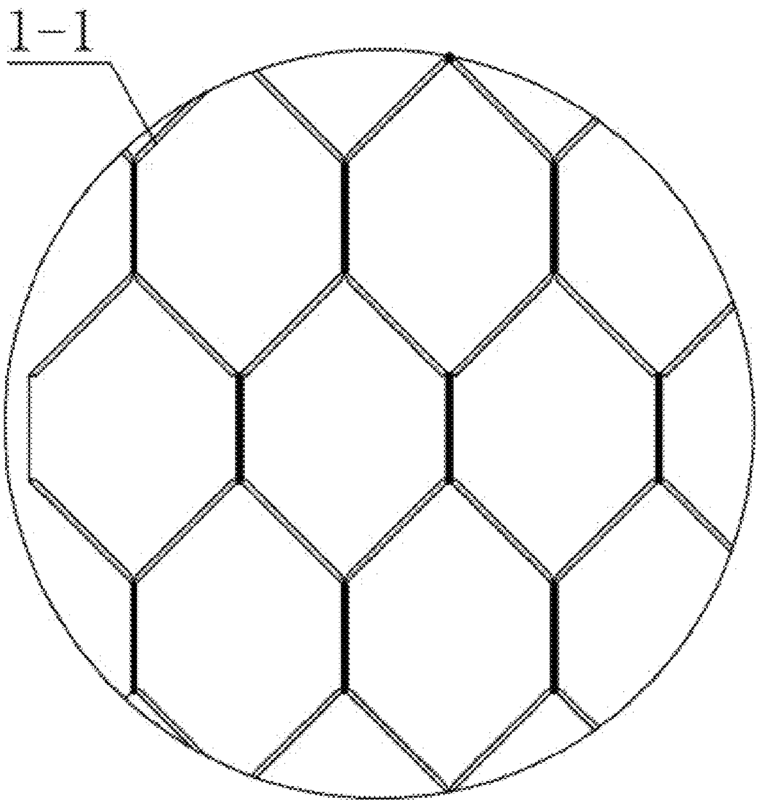
FIG. 4 is schematic enlarged view showing Portion D of FIG. 1.
Figure 5:
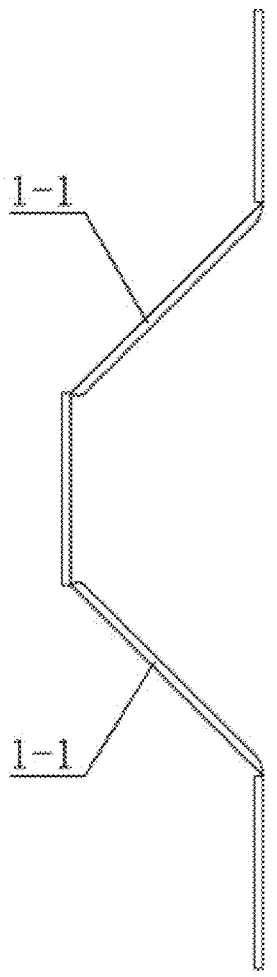
FIG. 5 is a schematic view showing a structure of a paper strip of the honeycomb cell shock-protection paper pad structure according to the present invention.
Figure 6:
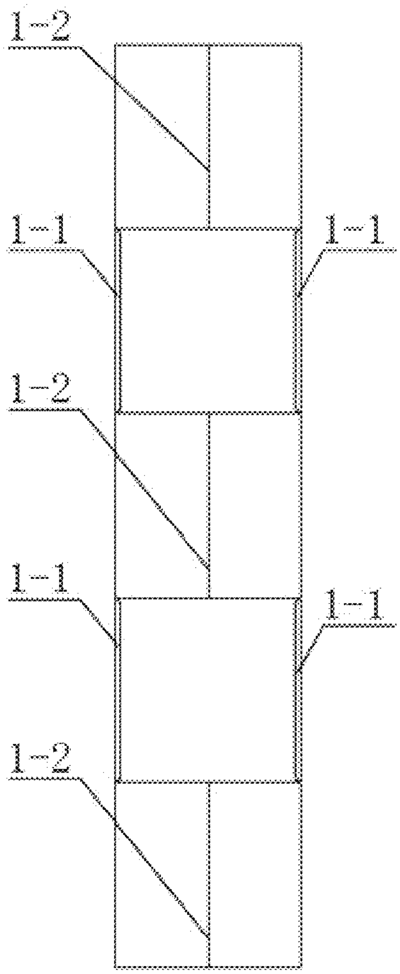
FIG. 6 is a left side view of FIG. 5.
Figure 7:
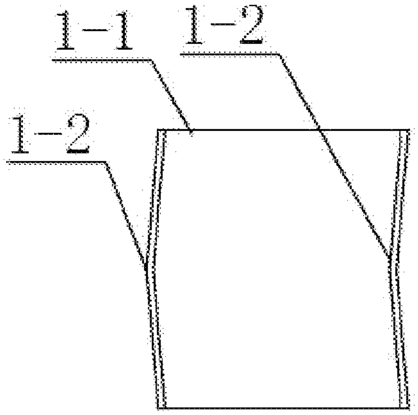
FIG. 7 is a top plan view of FIG. 5.
Figure 8:
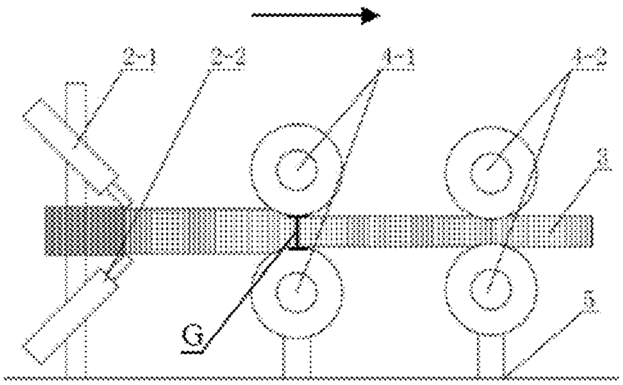
FIG. 8 is a schematic view showing a structure of a honeycomb cell shock-protection paper pad shape-fixing device according to the present invention, in which a feeding direction of the honeycomb cell shock-protection paper pad and a designated gap G between paired rollers are shown.
Figure 9:
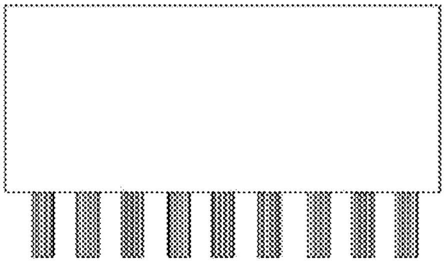
FIG. 9 is a schematic view showing a structure of flexible upper and lower scraper blades according to EMBODIMENT 1.
Figure 10:
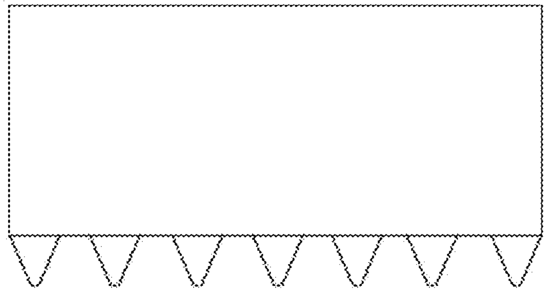
FIG. 10 is a schematic view showing a structure of flexible upper and lower scraper blades according to EMBODIMENT 2.

Reference is now made to the attached drawings.

A honeycomb cell shock-protection paper pad structure is provided. The shock-protection paper pad structure is formed of a group of paper strips that are connected together in a uniformly distributed and spaced manner, so that the paper strips collectively define a honeycomb cellular structure. The paper strip 1 is provided with folded-edge bend portions 1-1 at upper and lower ends of portions where the paper strips are not connected to one another, and the paper strip 1 is provided with a central bend portion 1-2 at portions where the paper strips are connected to one another.

After being shaped by providing the upper and lower ends of the paper strip 1 with the folded-edge bend portions 1-1 and by providing the paper strip 1 with the central bend portions 1-2 at the portions where the paper strips are connected to one another, the honeycomb cell shock-protection paper pad 3 is prevented from restoring to an original state in which the paper strips 1 are parallel with each other and close to each other, and a shock-absorbing effect of the honeycomb cell shock-protection paper pad 3 is enhanced.

A honeycomb cell shock-protection paper pad shape-fixing method is provided. The method is performed to stretch and extend a contracted cellular-form shock-protection paper pad that is formed of a group of parallel arranged paper strips connected to each other in a uniformly distributed and spaced manner, the method comprising:

Step A1, stretching and extending the contracted cellular-form shock-protection paper pad to form a honeycomb cell shock-protection paper pad in which the paper strips collectively define a plurality of honeycomb cells each having a hexagonal shape.

The purpose of Step A1 is to initially achieve a stretched and extended state.

Step A2, while maintaining the honeycomb cell shock-protection paper pad in the stretched state, passing the honeycomb cell shock-protection paper pad between a flexible upper scraper blade and a flexible lower scraper blade to cause upper and lower ends of the paper strips to bend toward the same side.

The flexible upper scraper blade and the flexible lower scraper blade operate on the honeycomb cell shock-protection paper pad in the stretched state such that, under an action of the flexible upper scraper blade and the flexible lower scraper blade, the honeycomb cell shock-protection paper pad is caused to form a uniformly extended state after stretching. The flexible upper scraper blade and the flexible lower scraper blade also cause the upper and lower ends of the paper strips to bend toward the same side, as preparation for bending and shaping in the next step.

Step A3, passing the honeycomb cell shock-protection paper pad processed in Step A2 between paired rollers having a designated gap therebetween to implement an operation of shape-fixing rolling to form a honeycomb cell shock-protection paper pad having a designated thickness, with the paper strips forming folded-edge bend portions on the upper and lower ends of the paper strips at portions where the paper strips are not connected to one another, and the paper strips forming central bend portions at portions where the paper strips are connected to one another.

The shape-fixing rolling implemented with the paired rollers causes the paper strips that have been processed in Step A2 to pass between the paired rollers in a state in which the upper and lower ends bend toward the same side, so as to form the folded-edge bend portions at the upper and lower ends of the paper strips at the portions where the paper strips are not connected to one another.

The designated gap between the paired rollers for the operation of shape-fixing rolling is in a range from 30% to 50% of a thickness of the honeycomb cell shock-protection paper pad before the honeycomb cell shock-protection paper pad enters the paired rollers.

In an embodiment of the present invention, the operation of shape-fixing rolling implemented in Step A3 is performed two to three times, in order to ensure that the folded-edge bend portions so formed do not elastically restore.

In an embodiment of the present invention, in Step A3, the paired rollers comprise hot rollers that perform heated pressing on the upper and lower ends of the paper strips at the portions where the paper strips are not connected to one another to form the folded-edge bend portions.

A honeycomb cell shock-protection paper pad shape-fixing apparatus comprises a chassis portion, an edge scraper portion, and a shape-fixing roller portion.

The edge scraper portion comprises a flexible upper scraper blade 2-1 and a flexible lower scraper blade 2-2. The flexible upper scraper blade 2-1 and the flexible lower scraper blade 2-2 are mounted obliquely on the chassis portion 5. A distance between the flexible upper scraper blade 2-1 and the flexible lower scraper blade 2-2 is less than a thickness of the honeycomb cell shock-protection paper pad 3.

The flexible upper scraper blade 2-1 and the flexible lower scraper blade 2-2 are arranged to uniformly extend the honeycomb cell shock-protection paper pad 3 and to cause the upper and lower ends of the paper strips to bend toward the same side, in preparation for the paired rollers to form folded-edge bend portions at the upper and lower ends of the portions where the paper strips are not connected to one another.

The shape-fixing roller portion comprises rigid shaping paired rollers 4-1. The rigid shaping paired rollers 4-1 are mounted on the chassis portion 5. A designated gap between the rigid shaping paired rollers 4-1 is in a range from 30% to 50% of a thickness of the honeycomb cell shock-protection paper pad 3 before the honeycomb cell shock-protection paper pad 3 enters the rigid shaping paired rollers 4-1.

In an embodiment of the present invention, the shape-fixing roller portion further comprises secondary rigid shaping paired rollers 4-2. The secondary rigid shaping paired rollers 4-2 are mounted on the chassis portion 5. A designated gap between the secondary rigid shaping paired rollers 4-2 is in a range from 50% to 65% of a thickness of the honeycomb cell shock-protection paper pad 3 before the honeycomb cell shock-protection paper pad 3 enters the secondary rigid shaping paired rollers 4-2. An entry end of the secondary rigid shaping paired rollers 4-2 is set to correspond to an exit end of the rigid shaping paired rollers 4-1. The secondary rigid shaping paired rollers 4-2 provide an effect of further fixing the shape of the folded-edge bend portions.

In an embodiment of the present invention, the flexible upper scraper blade 2-1 and the flexible lower scraper blade 2-2 are bristle brushes or flexible plates with teeth. The flexible upper scraper blade 2-1 and the flexible lower scraper blade 2-2 ensure that, during operation, no damage is caused on the honeycomb cell shock-protection paper pad 3.

In an embodiment of the present invention, the rigid shaping paired rollers 4-1 or the secondary rigid shaping paired rollers 4-2 are hot rollers.

I claim:

1. A honeycomb cell shock-protection paper pad shape-fixing method, wherein the method is performed to stretch and extend a contracted cellular-form shock-protection paper pad that is formed of a group of parallel arranged paper strips connected to each other in a uniformly distributed and spaced manner, the method comprising:

Step A1, stretching and extending the contracted cellular-form shock-protection paper pad to form a honeycomb cell shock-protection paper pad in which the paper strips collectively define a plurality of honeycomb cells each having a hexagonal shape;

Step A2, while maintaining the honeycomb cell shock-protection paper pad in a stretched state, passing the honeycomb cell shock-protection pad between a flexible upper scraper blade and a flexible lower scraper blade to cause upper and lower ends of the paper strips bend toward the same side, and Step A3, passing the honeycomb cell shock-protection paper pad processed in Step A2 between paired rollers having a designated gap therebetween to implement shape-fixing rolling to form a honeycomb cell shock-protection paper pad having a designated thickness, with the paper strips forming folded edge bend portions on the upper and lower ends of the paper strips at portions where the paper strips are not connected to one another, and the paper strips forming central bend portions at portions where the paper strips are connected to one another.

2. The honeycomb cell shock-protection paper pad shape-fixing method according to claim 1, wherein the shape-fixing rolling in Step A3 is performed two to three times.

3. The honeycomb cell shock-protection paper pad shape-fixing method according to claim 1, wherein the designated gap between the paired rollers is in a range from 30% to 50% of a thickness of the honeycomb cell shock-protection paper pad before the honeycomb cell shock-protection paper pad enters the paired rollers.

4. The honeycomb cell shock-protection paper pad shape-fixing method according to claim 1, wherein in Step A3, the paired rollers comprise hot rollers that perform heated pressing on the upper and lower ends of the paper strips at the portions where the aper strips are not connected to one another to form the folded-edge bend portions.

* * * * *